(12) United States Patent
Sangiacomo

(10) Patent No.: US 11,503,780 B2
(45) Date of Patent: Nov. 22, 2022

(54) POT COVER GROWING SYSTEM

(71) Applicant: Corey Sangiacomo, Ukiah, CA (US)

(72) Inventor: Corey Sangiacomo, Ukiah, CA (US)

( * ) Notice: Subject to any disclaimer, the term of this patent is extended or adjusted under 35 U.S.C. 154(b) by 328 days.

(21) Appl. No.: 16/594,572

(22) Filed: Oct. 7, 2019

(65) Prior Publication Data
US 2020/0107506 A1 Apr. 9, 2020

Related U.S. Application Data

(60) Provisional application No. 62/742,785, filed on Oct. 8, 2018.

(51) Int. Cl.
*A01G 9/02* (2018.01)
*A01G 24/60* (2018.01)
*A01G 24/22* (2018.01)
*A01G 22/00* (2018.01)

(52) U.S. Cl.
CPC .............. *A01G 24/60* (2018.02); *A01G 9/02* (2013.01); *A01G 22/00* (2018.02); *A01G 24/22* (2018.02)

(58) Field of Classification Search
CPC ........ A01G 24/60; A01G 24/22; A01G 24/50; A01G 24/40; A01G 24/20; A01G 24/00; A01G 13/0281; A01G 13/0262; A01G 22/00; A01G 9/02; A01G 9/029; A01G 9/0291; A01G 9/0293; A01G 2009/003; A01G 9/00; A01G 24/46
USPC ..... 47/20.1, 30, 66.6, 66.7, 74, 73, 65.5, 33, 47/65.8
See application file for complete search history.

(56) References Cited

U.S. PATENT DOCUMENTS

| | | | | |
|---|---|---|---|---|
| 1,988,886 | A * | 1/1935 | Wilson | A01G 13/043 47/29.1 |
| 4,209,945 | A * | 7/1980 | Dent | A01G 24/20 47/84 |
| 4,646,467 | A * | 3/1987 | Morrisroe | A01G 13/043 47/20.1 |
| 5,509,229 | A * | 4/1996 | Thomasson | A01G 13/043 47/29.5 |
| 11,102,938 | B2 * | 8/2021 | Witman | A01G 9/0293 |

FOREIGN PATENT DOCUMENTS

| | | | | |
|---|---|---|---|---|
| AU | 2015210379 A1 * | 2/2017 | ............... | A01G 9/02 |
| BE | 1024839 A1 * | 7/2018 | ............ | A01G 18/64 |
| CH | 634458 A5 * | 2/1983 | ........... | A01G 13/043 |
| CN | 107432185 A * | 12/2017 | .............. | A01G 22/00 |

(Continued)

*Primary Examiner* — Kathleen I Alker
(74) *Attorney, Agent, or Firm* — Cynthia S. Lamon; Lamon Patent Services

(57) ABSTRACT

A plant container conditioning system is provided including a growing pot having a top, bottom, sides and inner volume enabled to support and grow a plant. A cover is provided and enabled to completely contain a plant growing pot. A growing medium is contained within the pot and at least one layer of mulch, at least one layer of fertilizer and at least one layer of compost is applied on top of the growing medium in the pot, wherein at the end of a growing cycle of the plant, the at least one layers of the mulch, fertilizer and compost is applied on top of 10 the growing medium, the cover is placed over the pot and secured around the bottom surface, the pot and cover then remains outdoors for a time period between three and seven months.

13 Claims, 3 Drawing Sheets

(56) References Cited

FOREIGN PATENT DOCUMENTS

| | | | | | |
|---|---|---|---|---|---|
| CN | 108541487 | A | * | 9/2018 | ............ A01G 9/0293 |
| FI | 105440 | B | * | 8/2000 | ............. A01G 31/02 |
| FR | 2702126 | A1 | * | 9/1994 | ............ A01G 13/043 |
| FR | 2865890 | A1 | * | 8/2005 | ......... A01G 13/0281 |
| FR | 2886815 | A1 | * | 12/2006 | ............ A01G 13/043 |
| KR | 20110001391 | A | * | 1/2011 | ............. A01G 24/28 |
| KR | 101713522 | B1 | * | 3/2017 | ......... A01G 13/0262 |
| RU | 2647082 | C1 | * | 3/2018 | ............. A01B 79/02 |
| WO | WO-2019043966 | A1 | * | 3/2019 | ............. A01G 9/042 |

* cited by examiner

POT COVER GROWING SYSTEM

CROSS-REFERENCE TO RELATED APPLICATIONS

The instant application claims priority to Provisional Application U.S. 62/742,785, filed Oct. 8, 2018. All disclosure of the provisional application is incorporated herein at least by reference.

BACKGROUND OF THE INVENTION

1. Field of the Invention

The present invention is in the technical area of agriculture as it relates to cannabis and other annual plants being grown above ground in containers or pots.

2. Description of Related Art

The skilled person will understand that there a many types of pots, containers and planters of varying sizes used for home or commercial cultivating of various plants. For annuals plants, being plants that have one growing season, pots and/or containers often sit outdoors subject to weather and other elements which break down and weaken the material used to structure the pot or container and the elements within the pot or container. These pots need to be refreshed with additional soil, fertilizer and/or other growing medium prior to accepting a new plant for a new growing season. Additionally, the growing pots or containers need to be treated with insecticides or anti-fungal solutions between growing cycles.

What is clearly needed is an enclosed cover, specifically designed to tightly fit around a growing pot, and process of using said enclosed cover.

SUMMARY

An embodiment of the invention provides a plant container conditioning system, comprising a growing pot having a top, bottom, sides and inner volume enabled to support and grow a plant and a cover enabled to completely contain a plant growing pot. A growing medium may be contained within the pot and at least one layer of mulch, at least one layer of fertilizer and at least one layer of compost may be applied on top of the growing medium in the pot. Wherein at the end of a growing cycle in the fall, the at least one layers of the mulch, fertilizer and compost is applied on top of the growing medium, the cover is placed over the pot and secured around the bottom surface, the pot and cover then remains outdoors for a time period between three and seven months.

One embodiment provides that the pot is circular with a planar top and bottom and the cover fits adjacent to the top and sides of the pot. In one embodiment, the inner volume of the pot, over the time period, reaches a temperature between 100-225° F. In this embodiment, the at least one layer of mulch, fertilizer and compost decompose over the time period.

Another embodiment provides that each layer is contained separately within a biodegradable material having a same shape as the pot. Alternatively, the at least one layers of mulch, compost and fertilizer are contained together within the biodegradable material. In one embodiment, the compost is mushroom compost and the mulch is alfalfa hay.

A method for conditioning a growing medium in a plant growing pot, is provided in one embodiment comprising the steps of providing a plant growing pot with a growing medium; adding at least one layer of mulch, one layer fertilizer and one layer of compost on top of the growing medium. Next, a cover is placed completely over a top surface and sides of the growing pot, and with the growing pot outdoors for a time period of between 3-7 months, a temperature is reached at the growing pot, under the cover, of between 100-225° F.

DETAILED DESCRIPTION OF THE INVENTION

Figure 1:
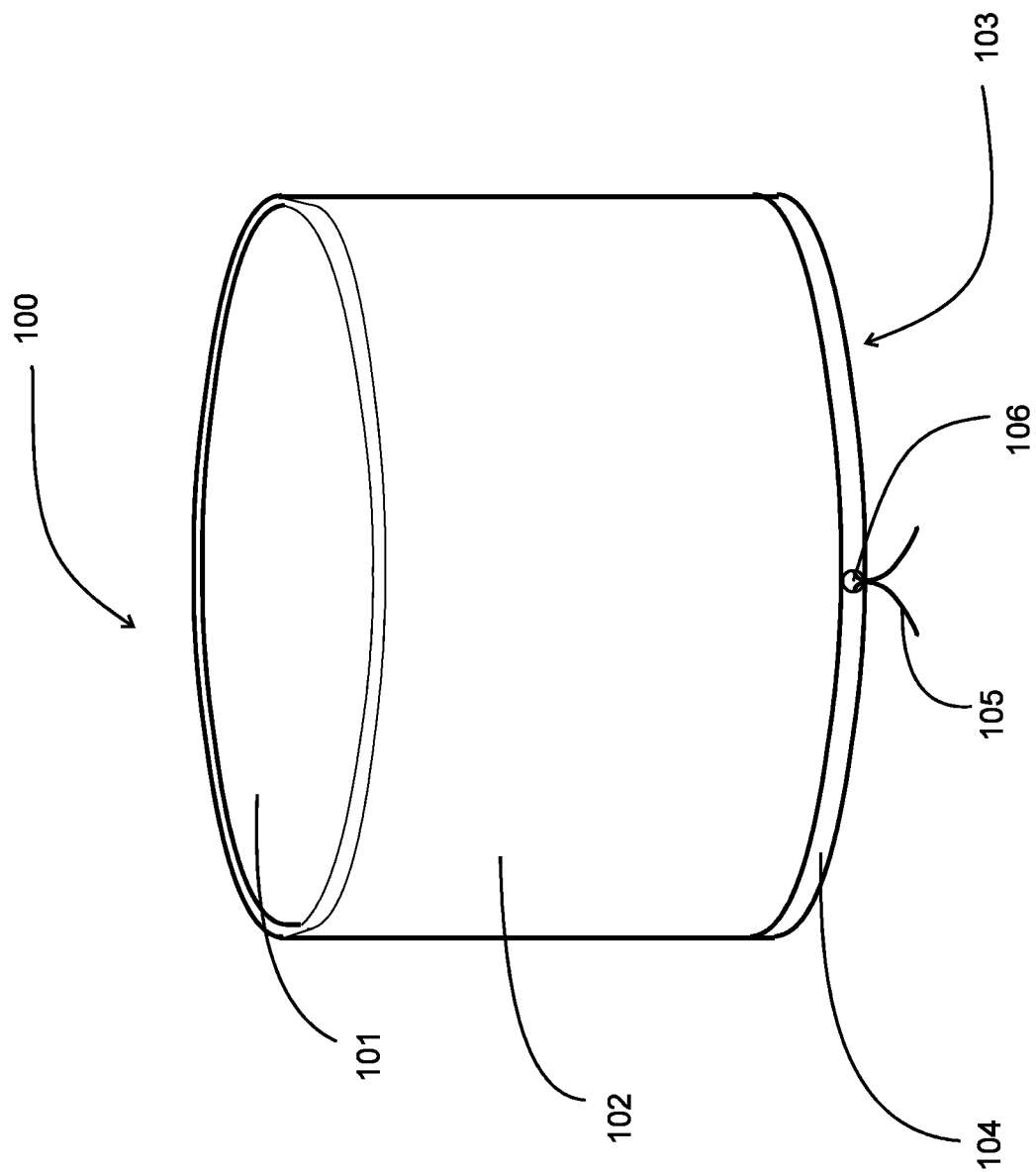
FIG. 1 is an elevation view of a grow pot system cover encasing a grow pot.

FIG. 1 shows the Pot Cover 100. The cover has a general shape of a cylinder or a canister in this embodiment. Material used in manufacturing the cover is typically reinforced polyethylene. The material in general is any one of 100% waterproof, heavy duty poly tarp having a 5-15 mil thickness. Thickness may vary depending on weather and freeze capabilities where the cover 100 is being used. Three ply poly material may be used with a range of 100-1500 Denier fibers coated within the poly material. Alternatively, vinyl may be used to coat the reinforce fibers or denier fibers. The material may include a mesh count per square inch of 10×10 to 15×15 mesh count per square inch. The material may be acid resistant, UV resistant, and mildew resistant.

The pot cover includes an enclosed circular top 101 and an open circular bottom 103. The open circular bottom may include a heat-sealed seam 104 creating a channel enabled to translate a cord 105. An opening in the seam allows end of cord 105 to extend through enabling tightening or loosening the cover around a base of a pot or container. A grommet 106 protects the opening from tares, etc. Grommet 106 may be made from aluminum or stainless steel, or another material that is capable of withstanding outdoor weather. In one embodiment, all seams are heat sealed.

The pot cover 100 is sized to cover pots or grow containers from 1-500 gallons. To completely and securely cover a 100 gallon pot, the cover, after placement over the pot, would be approximately 18 inches high with a 39 inch diameter. To cover a 150 gallon pot, the cover 100 would have a height of approximately 20" and a diameter of 46 inches. One with skill in the art readily understands that the pot cover and system may be manufactured to accommodate any size pot by either adjusting a height or diameter of the pot cover and layers, introduced below.

Figure 2:
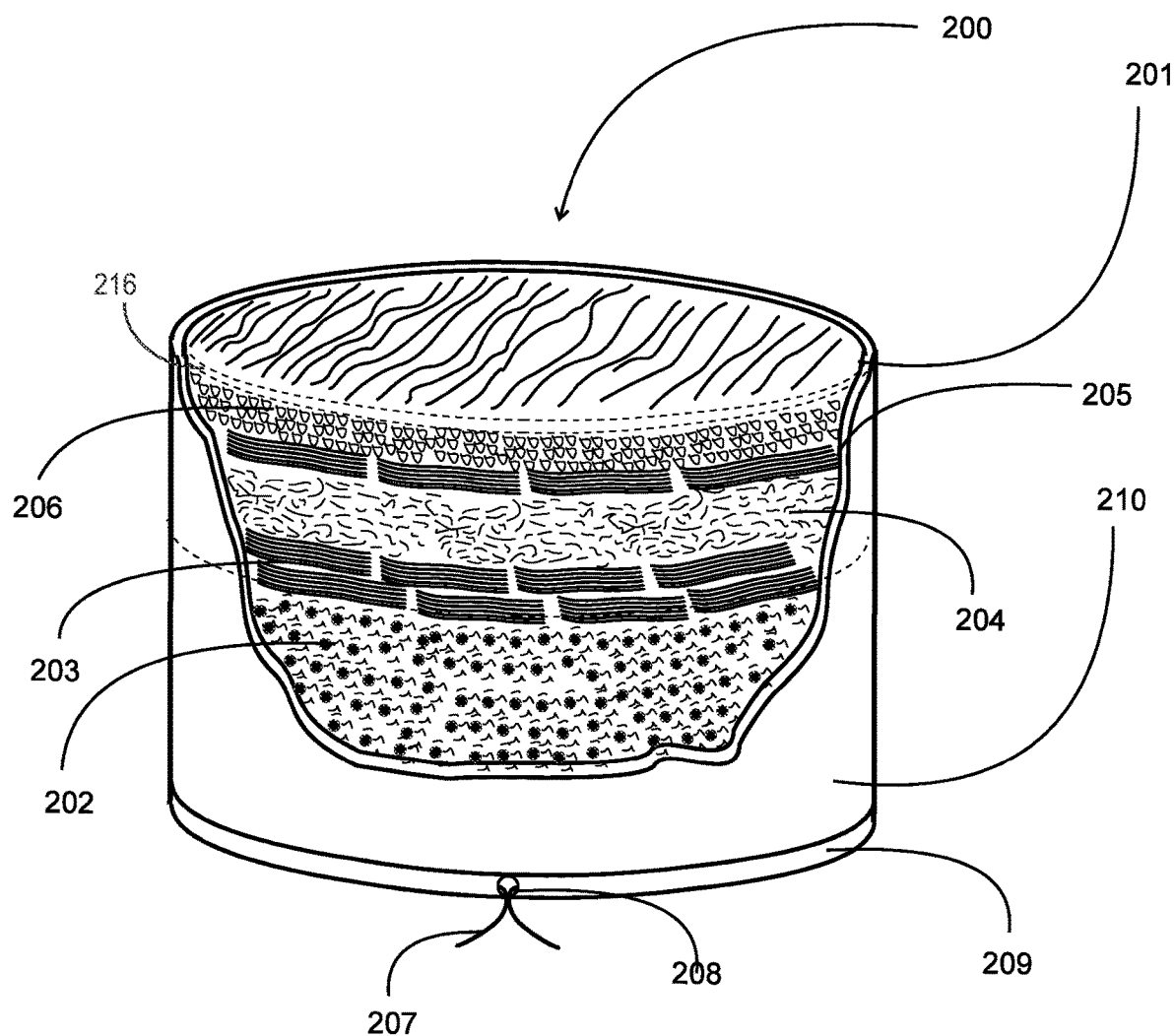
FIG. 2 is a cutaway view of the grow pot system of FIG. 1 showing growing medium layers within the grow pot.

FIG. 2 depicts a pot cover system 200 with a cutaway of both the pot and cover showing aspects of the system directly interacting within the pot or container 201. Pots and containers are typically flexible breathable growbags which were first produced in the 1970s for home use, but their use has since spread into market and commercial farming. They come in different sizes and formulations suited to specific crops. Breathable fabric allows roots to breathe and grow healthier, boosts plant growth and yields decreased risk of transplant shock, creates improved overall root structure and may keep plants warmer in winter and cooler in the summer. One problem known in the art is that these breathable pots or growbags tend to decompose or breakdown when subjected to outdoor weather. The pot cover 210 helps maintain the fiber material, protects it from the sun and weather thereby extending the life of the bag over many seasons longer than 3-5 years.

Pot or container 201 may be typically manufactured from a non-woven breathable polypropylene material. Typically, these breathable grow pots or smart pots only last 2-3 years. The grow life of the pots 201 may be extended considerably using the pot cover system of the present invention. In other embodiments, the growing pots may be made from typical materials such as rigid plastics and clay. Although the pot cover system may be utilized with any type grow pot, the system works best with grow pots that are made from the breathable material mentioned above.

The pot cover system includes layers that are dispensed upon existing and somewhat exhausted growing medium 202. Growing medium 202 may be any type of desired soil or grow medium. The main characteristic of growing medium 202 is that it has supported a plant or plants for an entire growing season and requires growing amendments and treatments which, over time (wintering), enables the soil medium in pot 201 to be ready to accept and grow plants for another growing season.

Prior to placing the pot cover 210 over pot 201 at the end of a growing season, a layer 203 of at least 1 inch of mulch, such as alfalfa hay or another nutritious and fibrous plant material similar to alfalfa, is evenly layered over the existing soil or grow medium 202. Rice hulls may be substituted or added to the alfalfa layer. The mulch 203 builds organic matter in a soil or growing medium providing nutrients to plant roots. Its high nitrogen content helps other organic material to decompose. Organic matter also helps to prevent compaction, acts like a sponge and holds moisture in the soil 202, improves soil structure, and helps to prevent erosion.

Next, a layer of poultry manure or other high nitrogen natural fertilizer 204 is evenly dispersed over the alfalfa layer 203 having a depth of at least 1 inch. A second alfalfa or other mulch layer 205 may be evenly dispersed over the manure layer 204. Finally, a 1 inch or more layer of mushroom compost 206 may be evenly dispersed over the second alfalfa layer 205. Next the layers may be mixed in with the existing soil 202. Alternatively, the layers are left intact and mixed just prior to a new planting.

The layers 206, 205 and 203 may be deeper than one inch, for example, 1-5 inches depending on how large the pot is. Larger gallon volume pots require thicker layers of amendments 206, 203 and 206. For example, a 100 gallon pot may require 1 inch layers, while a 500 gallon pot may require 3 inch layers. The pot is filled to top rim 216 when all of the layers 203, 205 and 206 are in the pot along with the growing medium.

After all layers have been added and the cover 210 in place over the grow pot, the seam 209 is adjacent to a base of the grow pot interacting with ground and cord 207 is pulled through grommet 208 and tightened forming a firm seal around the bottom of the grow pot 201. Once the pot cover 210 is in place and securely tied, air restriction occurs keeping contaminants at bay. The pot 201 may be of a dark color such as black, dark green or a rust or brick color. The particular advantage of the pot cover 210 being a dark color is, when exposed to direct or semi-direct sunlight, termed solarization, it collects and transfers radiant heat to the inner space within the cover thereby increasing a temperature of the soil and layers 202-206 to a level that kills mold, some viruses and bacteria that may be harmful to plants and soil in general. The temperature in this embodiment may range from 100-225 degrees F., depending upon ambient temperature.

The pot typically supports a plant through a growing season that may include a part of spring, all of summer and part of fall. In the fall, after a plant has finished a growing cycle, the layers are added to the growing medium and the cover placed over the pot and secured around a bottom surface of the pot. In some instances, additional growing medium may be added prior to adding layer after the growing season. The fully amended grow pot then rests outdoors over winter until spring growing season, which may be 3-7 months, depending on the geographic area the pot resides in.

Figure 3A:
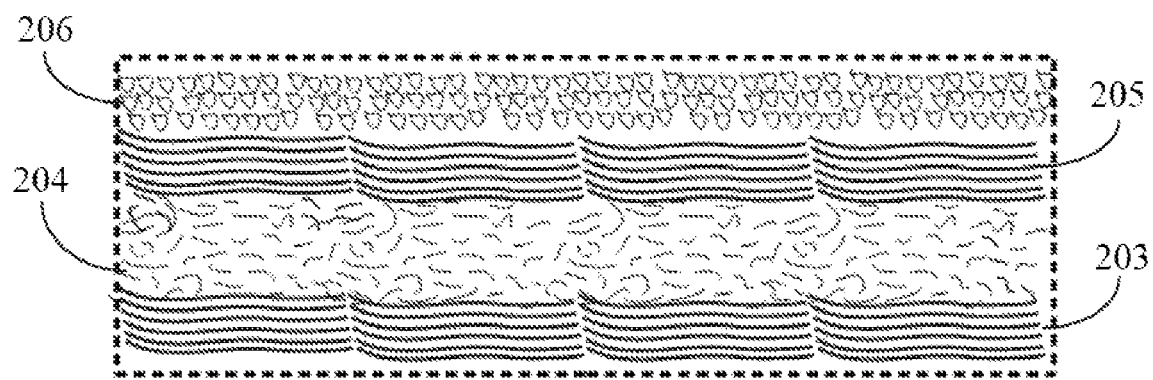
FIG. 3A is an elevation view a biodegradable pod holding multiple layers of amendments.
Figure 3B:
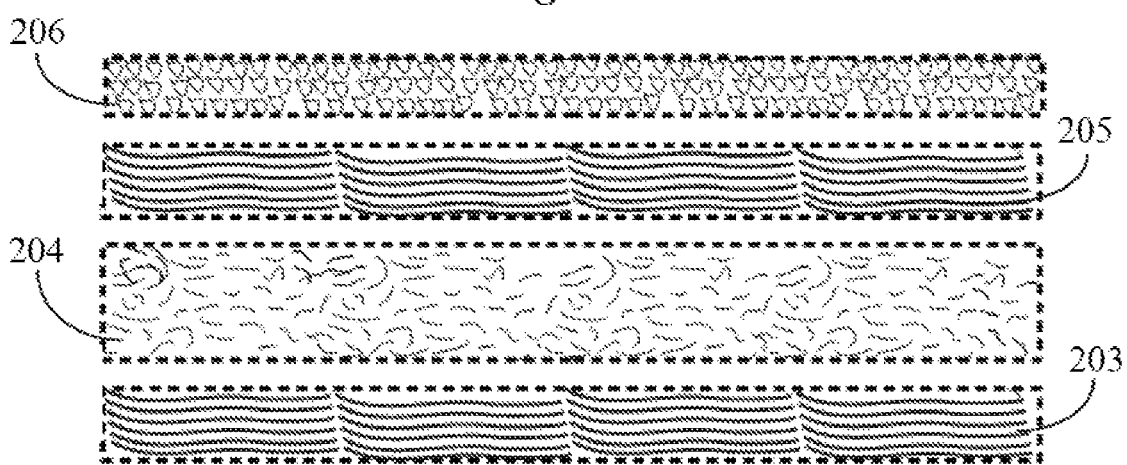
FIG. 3B is an elevation view depicting multiple individual pods, each holding a single layer of amendments.

FIGS. 3A and 3B show embodiments wherein the layers 203-206 may be sized and encased in a circular diameter to snuggly fit grow pots of varying sizes. In this embodiment, one only needs to place the individual layer pods from system 200 into the pots, cover with the cover 210 and let sit all winter. The layers may be encased in a material that is easily compo stable in moisture over time and easily degrades and mixes in with existing soil 202. Just prior to planting, the layers may be broken up and mixed with the existing soil. In yet another embodiment, one pod including all of the layers are arranged in layers or premixed and encased in said compostable material and placed within the grow pot prior to covering with pot cover 210. With the pot cover in place, the layers added, with the heat variant from the solarization and extended time sitting in this state, the pot poncho system protects the pot 201 from degradation. The system 200 also kills contaminants via solarized heat and is grow ready, meaning the soil is amended to a state of accepting a plant.

A circular shape for the pot cover may vary in other embodiments. The fabric pot 201 may be manufactured in a plurality of shapes, square, a geometric shape such as hexagon, etc. and the pot cover 210 of the present invention may be made to fit virtually any shape. For Example, there are known rectangular grow beds or square pots similar in material to the described pots, above. The pot cover system may be specifically designed to fit one or any of these shapes, no matter how large the beds, even in commercial grow houses. Additionally, encased layers of alfalfa or manure 202-206 may be enclosed in the compostable fabric in a square, rectangle, or any other shape required. One or more may be layered adjacent to each other for large beds.

The skilled person will understand that the embodiments taught in enabling detail herein are, in fact, exemplary, and there may well be other variations, not discussed in detail, that will still lie within the scope of the invention. Thus, it is intended by the appended claims to cover all such modifications and adaptations as fall within the true spirit and scope of the appended claims.

The invention claimed is:
1. A plant container conditioning system, comprising:
a growing pot having an open top defined by a top rim, a closed planar bottom, vertical sides and an inner volume enabled to support and grow a plant;
a cover having a width, a length, a height, a closed planar top, vertical sides, and an open bottom defined by a bottom rim encompassing the width, the cover having a solar absorbing color including any one of black, dark green, rust color and brick color, the cover enabled to completely contain the top, the sides and the inner volume of the pot;

growing medium contained within the pot; and at least one layer of mulch, at least one layer of fertilizer and at least one layer of compost;

wherein at the end of a growing cycle, the at least one layers of the mulch, fertilizer and compost are applied on top of the growing medium, filling the inner volume to the top rim and the cover is placed over the top and the sides of the pot with the planar top of the cover fitting adjacent to the top rim of the pot and the sides of the cover fitting adjacent to the sides of the pot, and the bottom rim of the cover is brought adjacent to and secured around the closed planar bottom of the pot, and the pot and the cover then remain outdoors for a time period between three and seven months.

2. The system of claim 1, wherein the pot is circular.

3. The system of claim 1, wherein the inner volume of the pot, over the time period, reaches a temperature between 100-225° F.

4. The system of claim 3, wherein the at least one layer of mulch, fertilizer and compost decompose over the time period.

5. The system of claim 1, wherein each layer is contained separately within a biodegradable material having a same shape as the pot.

6. The system of claim 1, wherein the at least one layers of mulch, compost and fertilizer are contained together within a biodegradable material having a same shape as the pot.

7. The system of claim 1, wherein the fertilizer is poultry manure, the compost is mushroom compost and the mulch is alfalfa hay.

8. A method for conditioning a growing medium in a plant growing pot, comprising the steps of:

providing a plant growing pot with a growing medium, the growing pot having an open top defined by a top rim, a closed planar bottom, vertical sides and an inner volume enabled to support and grow a plant;

at the end of the growing cycle of the plant, adding at least one layer of mulch, one layer fertilizer and one layer of compost on top of the growing medium filling the inner volume to the top rim and;

placing a cover over the growing pot, the cover having a width, a length, a height, a closed planar top, an open bottom defined by a bottom rim encompassing the width and the length, and a solar absorbing color including any one of black, dark green, rust color and brick color, the planar top of the cover fitting adjacent to the top rim of the pot and the sides of the cover fitting adjacent to the sides of the pot completely containing the top, sides and inner volume of the growing pot, and the rim fitting adjacent to the bottom of the growing pot;

securing the cover to the pot;

keeping the growing pot outdoors for a time period of between 3-7 months enabling the growing pot, under the cover, to reach a temperature of between 100-225° F.

9. The method of claim 8, wherein the growing pot is circular.

10. The method of claim 8, wherein the at least one layer of mulch, fertilizer and compost decompose over the time period.

11. The method of claim 8, wherein each layer is contained separately within a biodegradable material having a same shape as the pot.

12. The system of claim 8, wherein the at least one layers of mulch, compost and fertilizer are contained together within a biodegradable material having a same shape as the pot.

13. The method of claim 8, wherein the fertilizer is poultry manure, the compost is mushroom compost and the mulch is alfalfa hay.

* * * * *